No. 877,870. PATENTED JAN. 28, 1908.
J. W. SHONE & J. N. RAUBER.
W. V. WHITMORE & C. F. MILLER, EXECUTORS OF J. W. SHONE, DEC'D.
APPARATUS FOR MOLDING ARTIFICIAL STONE BLOCKS.
APPLICATION FILED FEB. 4, 1905. RENEWED OCT. 11, 1907.
2 SHEETS—SHEET 1.
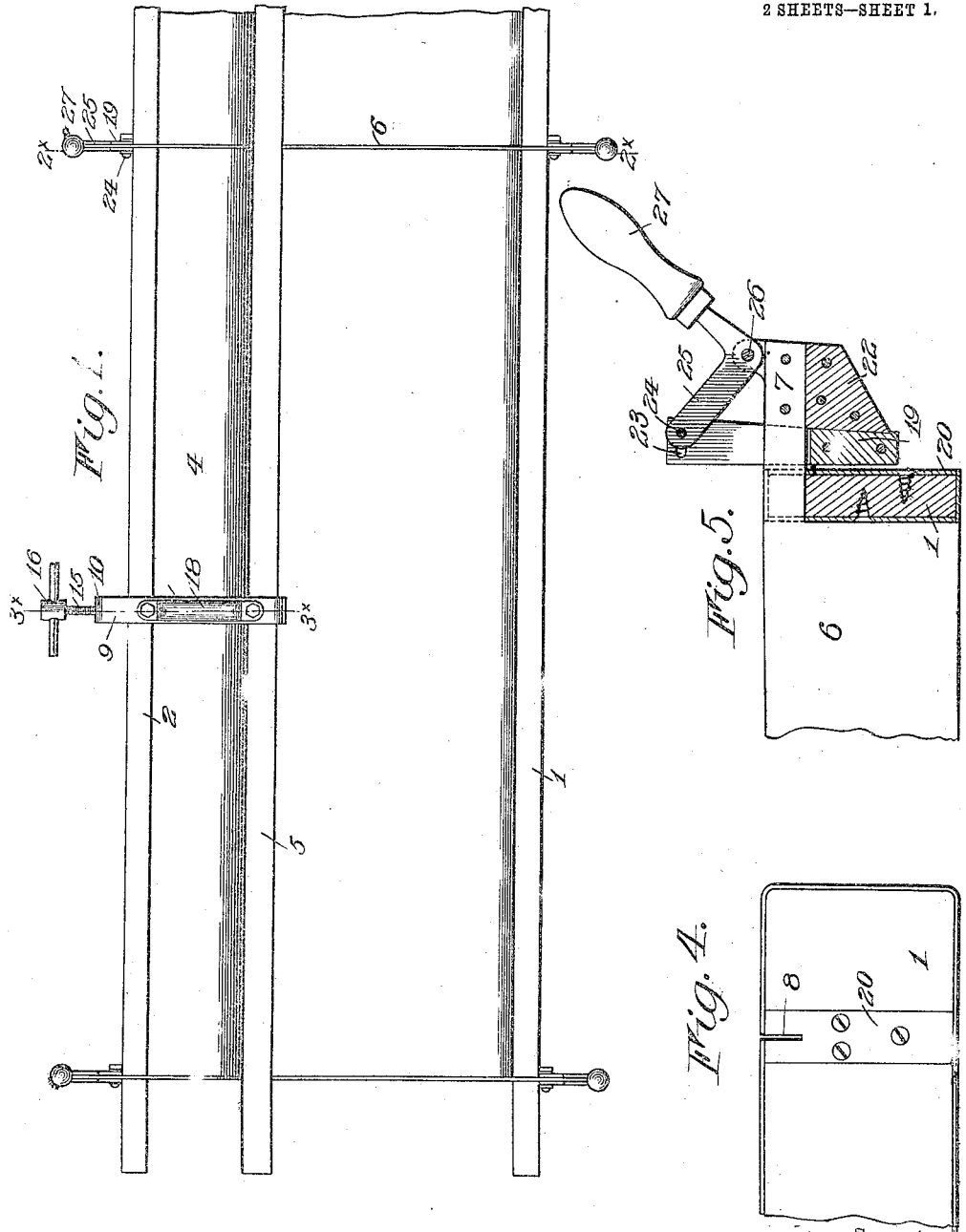

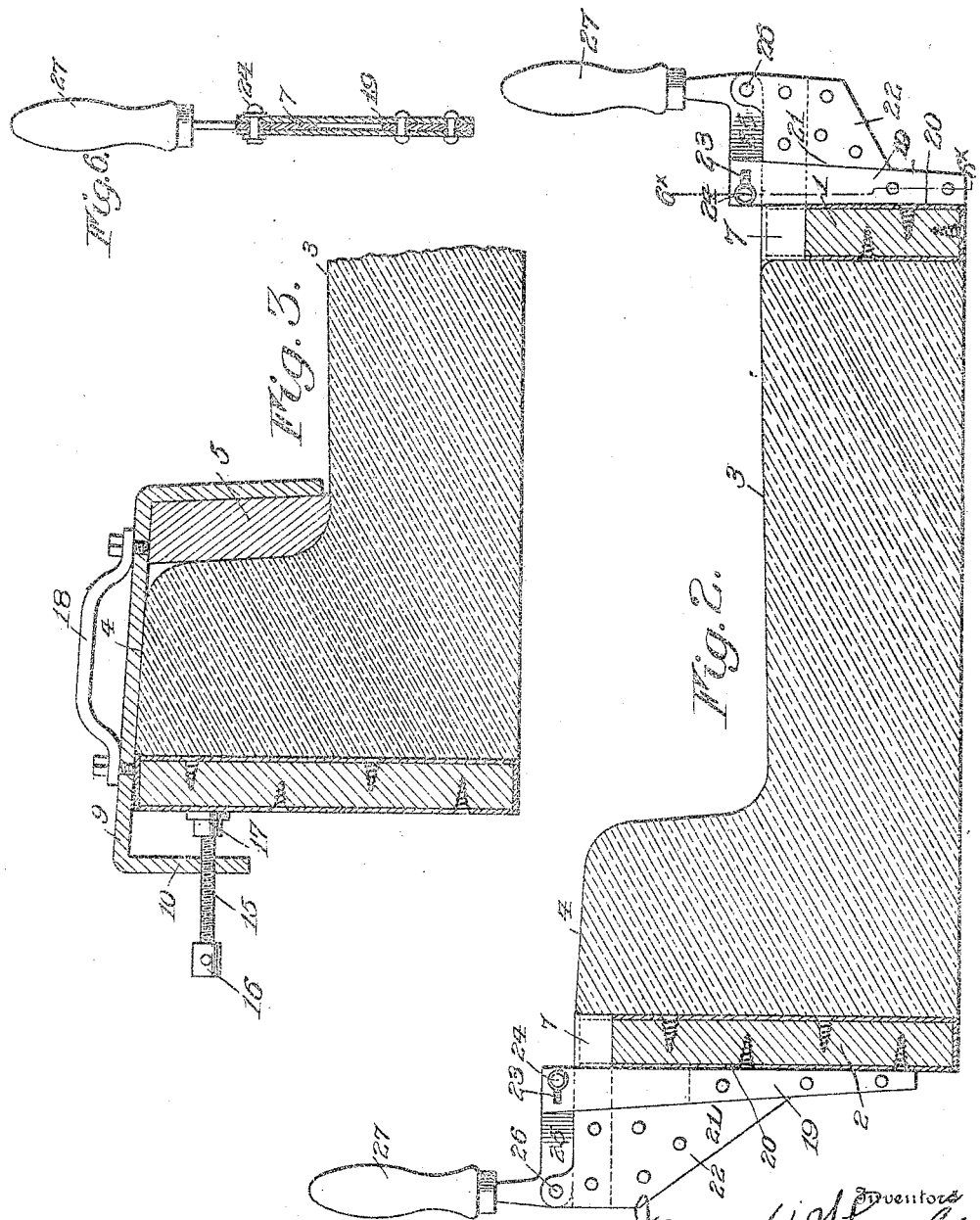

UNITED STATES PATENT OFFICE.

JAMES W. SHONE AND JOHN N. RAUBER, OF ROCHESTER, NEW YORK; WALTER V. WHITMORE AND CHARLES F. MILLER EXECUTORS OF SAID SHONE, DECEASED.

APPARATUS FOR MOLDING ARTIFICIAL-STONE BLOCKS.

No. 877,870.        Specification of Letters Patent.        Patented Jan. 28, 1908.

Application filed February 4, 1905. Serial No. 244,112. Renewed October 11, 1907. Serial No. 396,943.

*To all whom it may concern:*

Be it known that we, JAMES W. SHONE and JOHN N. RAUBER, of Rochester, in the county of Monroe and State of New York, have invented certain new and useful Improvements in Apparatus for Molding Artificial-Stone Blocks; and we do hereby declare the following to be a full, clear, and exact description of the same, reference being had to the accompanying drawings, forming a part of this specification, and to the reference-numerals marked thereon.

Our present invention relates to devices employed for manufacturing artificial stone blocks and it has for its object to provide an apparatus intended primarily for forming blocks which from their nature and size are adapted to be molded *in situ* although equally well adapted for making blocks of a different character.

Our invention has for its further object to provide such an apparatus for molding street gutters and curbs whereby these parts may be formed integrally and of any desired length.

To these and other ends the invention consists in certain improvements and combinations of parts, all as will be more fully explained, the novel features being pointed out in the claims at the end of this specification.

In the drawings: Figure 1 is a top plan view of an apparatus constructed in accordance with our invention. Fig. 2 is a cross sectional view thereof taken on the line $2^\times$—$2^\times$ of Fig. 1. Fig. 3 is a detail sectional view on the line $3^\times$—$3^\times$ of Fig. 1. Fig. 4 is a detail elevation of one end of one of the mold boards. Fig. 5 is a detail sectional view similar to Fig. 2 illustrating the operation of one of the locking devices and Fig. 6 is a detail sectional view on the line $6^\times$—$6^\times$ of Fig. 2.

Similar reference numerals indicate similar parts in the several figures.

In the present illustration of an apparatus embodying our invention we have shown a device adapted to be employed for molding heavy blocks or monoliths which are formed in the position they are to occupy, such, for instance as combined gutter and curb stones for streets, or roads, and it is in connection with this form of block that the following description has particular reference although it will be understood that the same or equivalent parts of the apparatus may be equally well employed for manufacturing blocks or stones of a different character and intended for other uses.

The apparatus consists of mold boards 1 and 2 adapted for forming, or molding, the front and rear sides respectively of the block. In the present instance the front face of the block, at the edge of the gutter bottom 3, is narrower than the face at the rear edge of the curb portion 4, so that the plane of its upper edge is below the plane of the top board 2. Located between these planes and arranged between the boards 1 and 2 is a third board or riser 5 against which the inner face of the curb portion 4 is molded as shown particularly in Fig. 3.

The means employed for temporarily supporting the boards 1 and 2 in operative position consists of plates 6 which are preferably formed of thin material and are adapted to form division plates between the ends of adjacent blocks when the latter are arranged in successive order. Each of these plates are provided with arms or extensions 7 projecting through slots or apertures 8, provided in the upper edges of the board and carrying the locking devices for securing the parts together. In the present instance the plates 6 are formed with an outline corresponding to the cross section of the block and as they are located near the ends of the apparatus their upper edges also form supports for the ends of the board 5 while their vertically extending portions, corresponding to the inner face of the curb, form stops against which said board is securely held in a substantially vertical position by means of a suitable clamping device. The latter is preferably located centrally between the plates 6 and consists of an arm 9 which extends over the top of the board 2 and is provided with a downwardly extending end 10 supporting a threaded clamping bar 15 provided at its outer end with a handle 16 by means of which the clamping head 17 at its opposite extremity may be moved into engagement with the board 2. Secured on the arm 9 is a handle 18 which facilitates placing the device in position and subsequently removing it.

The ends of the plates 6 form shoulders against which the boards 1 and 2 abut when held in operative position by their locking devices which are supported on the extremities of said plates and comprise vertically operating members, or wedges, 19. One edge of each of the members engages a wear plate 20, on the board, while the opposite edge bears against an inclined surface 21 formed on a downwardly projecting block 22 rigidly secured to the extension 7. In order to secure the members 19 in proper position and to prevent their removal from the plate 6 they are formed, as shown in Figs. 5 and 6, with the separated side portions embracing their respective arm or extension 7, their upper ends being provided with elongated apertures 23, receiving pins 24, on the arms 25, of an operating bell crank lever pivoted at 26, the other portion of which is provided with a handle 27.

In building walls, copings, street curbs or similar structures in which the blocks are arranged end to end the work may be facilitated and greater accuracy obtained by forming the molding boards so that their ends project beyond the division plates, the space included between the boards at one end of the apparatus forming a partial mold for the adjacent, or succeeding block, while the corresponding ends projecting at the opposite extremity thereof form guides by means of which the device may be alined on the end of a previously constructed block as will be seen in Fig. 1.

The operation of the apparatus will now be readily understood. The ground, or other surface on which the block is to rest, having been leveled or otherwise prepared, the apparatus, after its parts have been clamped or locked together, is placed in the desired position. The concrete mixture composed of cement and other ingredients is packed solidly between the boards 1 and 2. If a combined gutter and curb block is to be formed the mixture is "stopped off" on a level with the plane of the top of the board 1. The board 5 is then placed in position and secured by its clamping device and the mixture subsequently packed in position between it and the board 2. When more than one block is to be formed the concrete material is also placed between the ends of the boards projecting beyond one of the plates 6. The operation being completed, the handles 27 are then operated outwardly to rotate the arms 25 and elevate the members or wedges 19, as shown in Fig. 5. This movement unlocks the boards and plates, permitting the latter to be drawn upwardly and removed from between the ends of the blocks, after which the space formerly occupied by them may be filled with liquid cement or other compound which will prevent the entrance of moisture into the space thus formed. The boards 1 and 2 being liberated may be withdrawn and carried forward to be set in position for molding another block, the partially completed end of which serves to properly position the apparatus as one of the plates 6 is either reinserted in the position it formerly occupied or else allowed to remain in such position, having been raised vertically only a sufficient distance to elevate the arms or extensions 7 thereon above the upper edges of the boards 1 and 2 to permit the latter to be drawn longitudinally into their new position.

Obviously blocks of various sizes and contour can be readily manufactured by changing the shape or character of the mold boards and the line of work can be extended any desired length in perfect alinement.

We claim as our invention:

1. In an apparatus for molding blocks, the combination with boards for forming the side faces of the block and plates arranged between the boards, of arms on the plates extending beyond the boards, levers journaled thereon and locking devices connected to said levers and coöperating with the boards.

2. In an apparatus for molding artificial stone blocks, the combination with mold boards for forming the side faces of a block and end plates having arms extending beyond said boards, of locking members embracing the arms and levers pivoted on the latter each having one end engaging its respective locking member and the other end forming an operating handle.

3. In an apparatus for molding artificial stone blocks, the combination with mold boards for forming the side faces of a block and end plates having arms extending beyond said boards, of plates secured to the sides of the arms and extending above and below their respective arms, a locking member comprising side pieces bearing against each plate and a lever pivoted between the plates and having one end connected to the locking member.

JAMES W. SHONE.
JOHN N. RAUBER.

Witnesses:
G. WILLARD RICH,
F. N. HOWARD.